(12) United States Patent
Palzer et al.

(10) Patent No.: US 10,960,898 B2
(45) Date of Patent: Mar. 30, 2021

(54) METHOD AND ARRANGEMENT FOR INTERACTING WITH A SUGGESTION SYSTEM HAVING AUTOMATED OPERATIONS

(71) Applicant: Volkswagen Aktiengesellschaft, Wolfsburg (DE)

(72) Inventors: Daniel Palzer, Berlin (DE); Helge Schäfer, Lehrte (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/467,035

(22) PCT Filed: Jan. 9, 2018

(86) PCT No.: PCT/EP2018/050391
§ 371 (c)(1),
(2) Date: Jun. 5, 2019

(87) PCT Pub. No.: WO2018/134073
PCT Pub. Date: Jul. 26, 2018

(65) Prior Publication Data
US 2019/0329795 A1    Oct. 31, 2019

(30) Foreign Application Priority Data
Jan. 18, 2017    (DE) ..................... 10 2017 200 735.4

(51) Int. Cl.
*B60W 50/14*    (2020.01)
*G06F 9/451*    (2018.01)
(Continued)

(52) U.S. Cl.
CPC ............. *B60W 50/14* (2013.01); *B60K 35/00* (2013.01); *G06F 3/0488* (2013.01);
(Continued)

(58) Field of Classification Search
CPC ............. B60K 35/00; B60K 2370/162; B60K 2370/182; B60K 2370/11; B60W 50/14; G06F 3/0488
See application file for complete search history.

(56) References Cited

U.S. PATENT DOCUMENTS

| 9,355,546 B2 | 5/2016 | Kim et al. | |
| 2008/0036577 A1* | 2/2008 | Natsume | B60W 50/14 |
| | | | 340/425.5 |

(Continued)

FOREIGN PATENT DOCUMENTS

| DE | 10315047 A1 | 10/2004 | ............. B60R 16/02 |
| DE | 102009045511 A1 | 4/2011 | ............. B60R 16/02 |

(Continued)

OTHER PUBLICATIONS

International Search Report and Written Opinion, Application No. PCT/EP2018/050391, 17 pages, dated Apr. 16, 2018.

(Continued)

*Primary Examiner* — Amy M Levy
(74) *Attorney, Agent, or Firm* — Slayden Grubert Beard PLLC

(57) ABSTRACT

A recommendation for performing an operation is generated for the interaction with a suggestion system having automated operations. A probability value for the performance of the recommended operation is determined. The recommended operation is automatically performed if a high probability value is determined therefor. Information about the automatically performed operation and an operating element for aborting or reversing the automatically performed operation are displayed. If an actuation of the displayed operating element by a user is detected, the automatically performed operation is aborted or reversed. The information about the automatically performed operation can be displayed on a first display and the operating (Continued)

Figure 1:
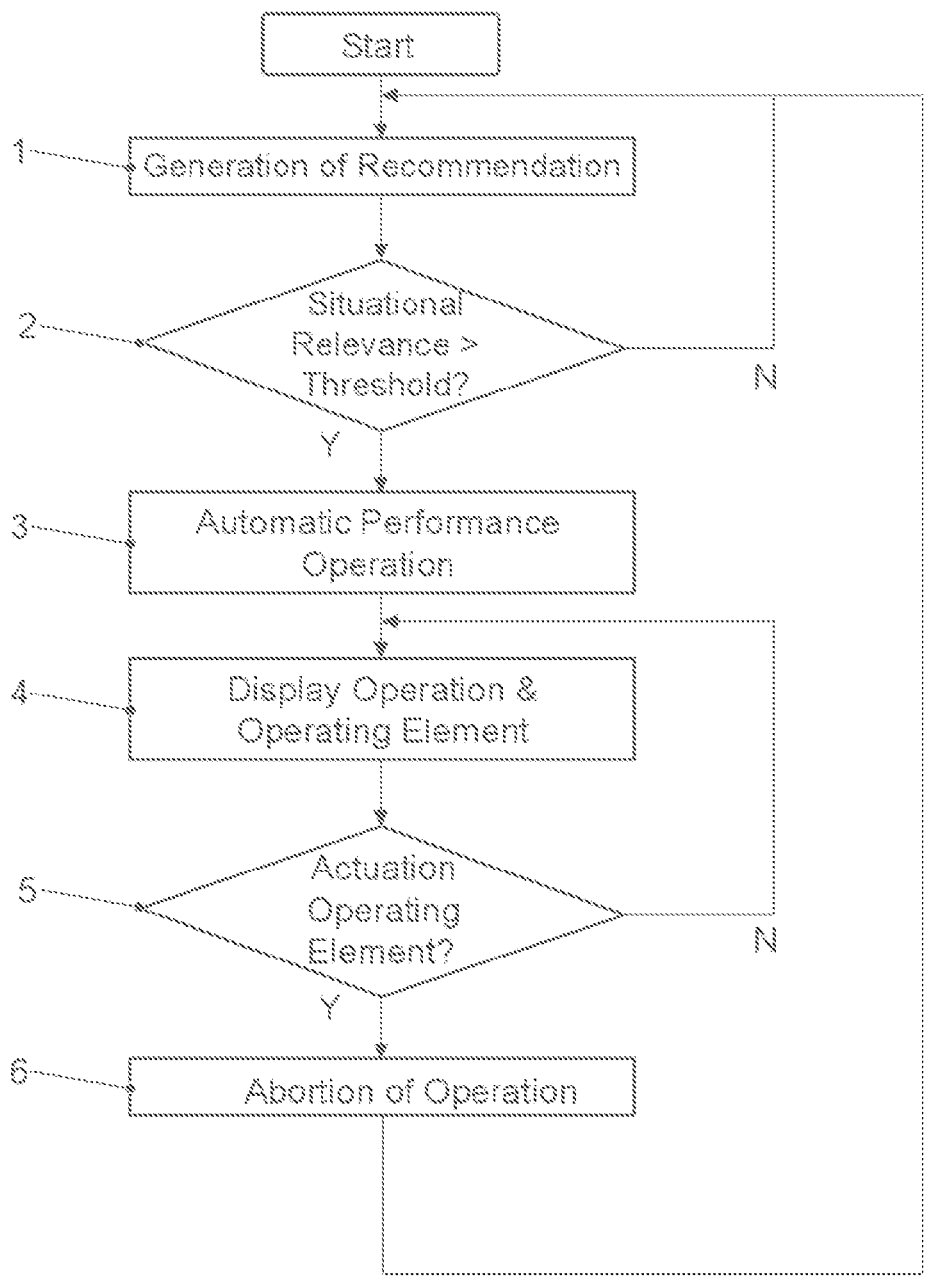

element for aborting or reversing the automatically performed operation may be displayed on a second display.

15 Claims, 3 Drawing Sheets

(51) Int. Cl.
  *B60K 35/00*    (2006.01)
  *G06F 3/0488*   (2013.01)
  *G06F 3/14*    (2006.01)

(52) U.S. Cl.
  CPC ............ *G06F 3/1423* (2013.01); *G06F 9/453* (2018.02); *B60K 2370/1438* (2019.05); *B60K 2370/152* (2019.05); *B60K 2370/1529* (2019.05); *B60K 2370/164* (2019.05); *B60K 2370/166* (2019.05); *B60K 2370/182* (2019.05); *B60W 2050/146* (2013.01); *B60W 2556/50* (2020.02)

(56) References Cited

U.S. PATENT DOCUMENTS

| | | | | |
|---|---|---|---|---|
| 2009/0192670 | A1* | 7/2009 | Hara ................... | B60R 16/037 701/36 |
| 2011/0118897 | A1 | 5/2011 | Menard et al. .............. | 701/1 |
| 2011/0166748 | A1* | 7/2011 | Schneider ............. | B60K 35/00 701/36 |
| 2013/0138591 | A1 | 5/2013 | Ricci .............................. | 706/46 |
| 2014/0062946 | A1 | 3/2014 | Graumann et al. ........... | 345/174 |
| 2014/0317698 | A1 | 10/2014 | Zafiroglu et al. ................. | 726/4 |
| 2014/0359499 | A1* | 12/2014 | Cho .......................... | G06F 8/38 715/765 |
| 2015/0112571 | A1* | 4/2015 | Schmudderich ...... | B60W 30/14 701/93 |
| 2015/0160019 | A1 | 6/2015 | Biswal et al. .................... | 701/1 |
| 2015/0258912 | A1* | 9/2015 | Kuhn ................... | B60W 50/14 701/22 |
| 2015/0283904 | A1* | 10/2015 | Schlittenbauer ....... | B60K 37/06 345/173 |
| 2015/0339031 | A1* | 11/2015 | Zeinstra ................. | B60K 37/06 715/747 |
| 2015/0371408 | A1* | 12/2015 | Schultz ................. | G06T 11/001 345/589 |
| 2015/0375699 | A1* | 12/2015 | Lamprecht ............ | B60R 16/037 701/2 |
| 2016/0009296 | A1* | 1/2016 | Iguchi .................. | G07C 5/0808 701/36 |
| 2016/0068169 | A1 | 3/2016 | Goldman-Shenhar et al. ............. 706/46 |
| 2016/0171374 | A1* | 6/2016 | Kim ...................... | G05B 15/02 706/46 |
| 2016/0231855 | A1* | 8/2016 | Bendewald ........... | B60W 50/14 |
| 2017/0096143 | A1* | 4/2017 | Murrish ................ | B60W 50/14 |
| 2017/0113513 | A1* | 4/2017 | Yanatsubo ............. | B60K 35/00 |
| 2017/0197637 | A1* | 7/2017 | Yamada .......... | B60W 30/18154 |
| 2017/0303842 | A1 | 10/2017 | Yoshida et al. | |
| 2018/0093676 | A1* | 4/2018 | Emura ................. | G05D 1/0257 |
| 2018/0141569 | A1* | 5/2018 | Ishisaka ............. | B60W 50/085 |
| 2019/0023129 | A1 | 1/2019 | Huger et al. | |

FOREIGN PATENT DOCUMENTS

| | | | | |
|---|---|---|---|---|
| DE | 102010042500 | A1 | 5/2011 | ............ B60R 16/02 |
| DE | 102012005866 | A1 | 9/2013 | ............ B60K 37/02 |
| DE | 102016200061 | A1 | 7/2017 | ............ B60R 16/02 |
| DE | 102017200735 | A1 | 7/2018 | ............ B60R 16/02 |
| EP | 2017774 | A2 | 1/2009 | ............ G01C 21/26 |
| JP | 2016064773 | A | 4/2016 | ............ A61B 5/0476 |
| KR | 20140100629 | A | 8/2014 | ............ B60K 28/00 |
| KR | 20150145023 | A | 12/2015 | ............ B60W 40/08 |
| KR | 20160050037 | A | 5/2016 | ............ B60K 37/06 |
| WO | 2015/131341 | A1 | 9/2015 | ............ G06F 15/18 |
| WO | 2018/134073 | A1 | 7/2018 | ............ B60W 50/14 |

OTHER PUBLICATIONS

Korean Office Action, Application No. 20197013721, 6 pages, dated May 13, 2020.

German Office Action, Application No. 102017200735.4, 6 pages, dated Dec. 10, 2020.

* cited by examiner

METHOD AND ARRANGEMENT FOR INTERACTING WITH A SUGGESTION SYSTEM HAVING AUTOMATED OPERATIONS

CROSS-REFERENCE TO RELATED APPLICATIONS

This application claims priority to German Patent Application No. DE 10 2017 200 735.4, filed on Jan. 18, 2017. The contents of this application are incorporated herein for all purposes.

TECHNICAL FIELD

The present invention relates to a method and an arrangement for interacting with a suggestion system having automated operations, which system can in particular be used in a graphical user interface in a vehicle. The present invention also relates to a vehicle that is configured to carry out a method of this kind or that comprises an arrangement of this kind.

BACKGROUND

In many technical fields, user interfaces (abbreviated to HMI from "Human Machine Interface") are used for interactions with machines and devices, with graphical user interfaces (abbreviated to GUI) now being prevalent. Graphical user interfaces can be used to display graphical elements and complex operating sequences on a screen surface. Operation can take place by means of a multiplicity of various input devices, for example by touching a touch-sensitive display surface, a so-called touchscreen.

The complexity of an HMI comprising an extensive range of functions and/or a multiplicity of functionalities can be so great that said functionalities cannot all be displayed in a useful manner at the same time, even if the HMI has a plurality of displays. There is also the risk that, by displaying a multiplicity of image and/or operating elements, the clarity and operability of the GUI is impaired.

This can be problematic, for example in the case of GUIs in the automotive sector, in particular if they are intended for the driver of the vehicle during travel. In this case, the display of information and the operation should be as simple and intuitive as possible, in order to minimize distraction from the driving task and thus ensure driving safety.

Distraction and/or disruption of the vehicle driver can be reduced and ease of operation can be increased by detecting the user behavior and use situation in order to adapt and/or automate operation on this basis depending on the situation or to give the user recommendations for operation.

A system and a method for suggesting and automating actions in a vehicle is described in US 2016/0068169 A1, recommendations being given if behavior that could be improved is exhibited. Similarly, US 2015/0160019 A1 discloses a vehicle-internal computer system that automatically performs actions in order to ensure that the cognitive load for the driver does not become too high. In this way, for example, an incoming telephone call can be automatically rejected and information about this can be displayed to the driver.

SUMMARY

An object of the invention is to provide a method and arrangement for interacting with a suggestion system that has automated operations and low interactional complexity and may be used for example in a vehicle.

This object is solved by a method and a corresponding arrangement according to the independent claims. Various embodiments of the invention are discussed in the dependent claims and the following specification.

In one aspect, a method of interacting with a suggestion system having automated operations comprises the following steps:

generating a recommendation for an operation;

determining a probability value for the performance of the recommended operation;

automatically performing the recommended operation if a high probability value is determined therefor;

displaying information about the automatically performed operation and displaying an operating element for aborting or reversing the automatically performed operation;

detecting an actuation of the displayed operating element by a user;

aborting or reversing the automatically performed operation upon actuation of the displayed operating element.

The interaction according to the present aspect with a suggestion system having automated operations makes it, e.g., possible to abort or reverse an automatically performed operation in a simple and intuitive manner in only one operating step and therefore makes it possible for the user to maintain control even in the case of automatically performed operations.

BRIEF DESCRIPTIONS OF THE DRAWINGS

Figure 2A:
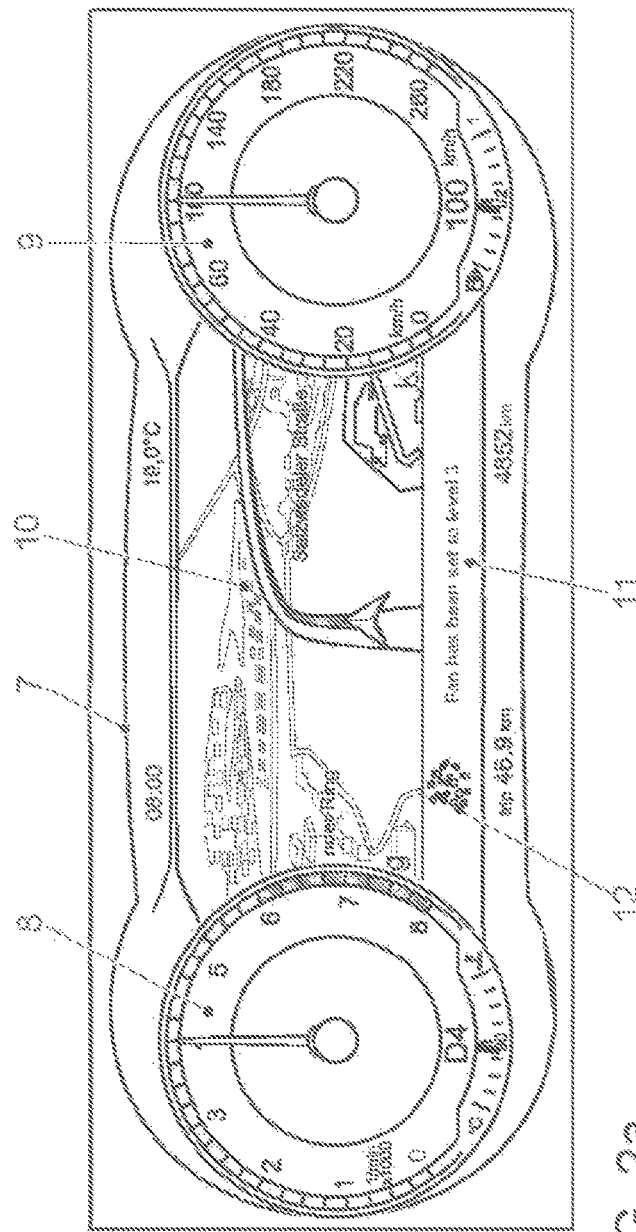
Figure 2B:
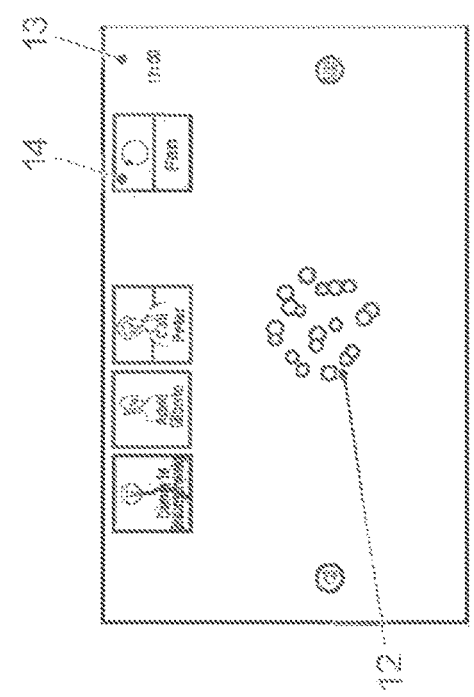
Figure 3:
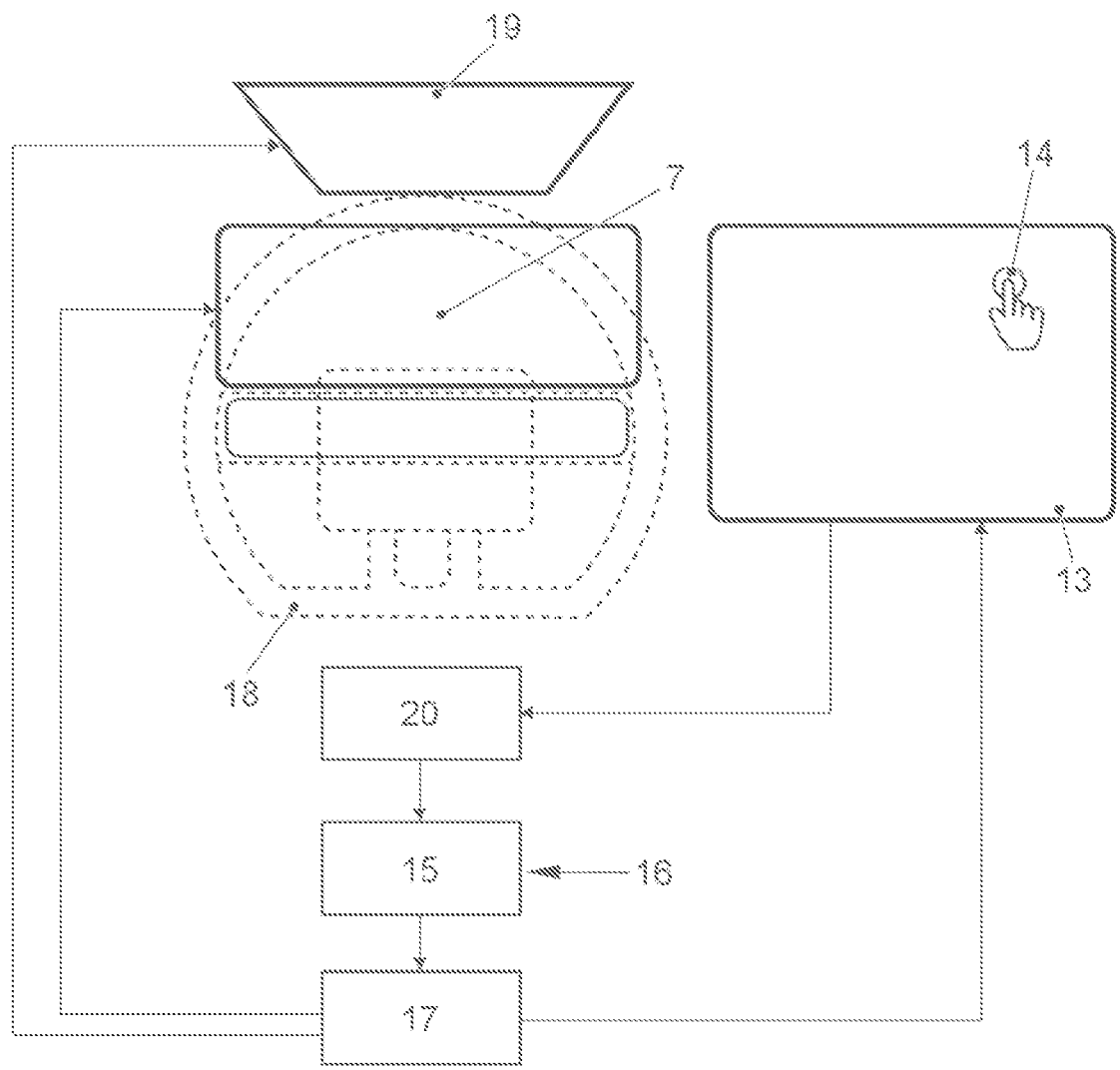

FIG. 1 schematically shows an embodiment of a method for interacting with a suggestion system for operations;

FIGS. 2a and 2b schematically show a multi-display graphical user interface for an embodiment of a suggestion system in a vehicle having the option of user interaction; and FIG. 3 shows a schematic block diagram of an embodiment of an arrangement for interacting with a suggestion system.

DETAILED DESCRIPTION

According to one embodiment, the information about the automatically performed operation is displayed on a first display and the operating element for aborting or reversing the automatically performed operation is displayed on a second display.

Clarity is enhanced by allocating the display of information about the automatically performed operation and the display of an operating element for aborting the automatically performed operation to separate displays. Furthermore, this in some embodiments may enable the information to be displayed on a first display, which is in the immediate field of vision of the user but which is optionally not readily operable, and may enable separate operation via a second display that is particularly suitable for this purpose.

In some embodiments, the probability value for the performance of the recommended operation is determined from previous user behavior and/or external parameters.

In some embodiments, the external parameters for determining the probability value may comprise the current time and/or current position of the user.

In another aspect, an arrangement for interacting with a suggestion system for operations comprises a control unit, at least one display, and a detection unit, wherein the control unit generates a recommendation for performing an operation, determines a probability value for the performance of the recommended operation, and automatically performs the recommended operation if a high probability value is determined therefor;

information about the automatically performed operation and an operating element for aborting or reversing the automatically performed operation is being displayed on the at least one display;

the detection unit detects an actuation of the displayed operating element by the user;

and the control unit aborts or reverses the automatically performed operation upon actuation of the operating element.

In some embodiments, the arrangement may be provided in a vehicle and/or the suggestion system may recommend operations for an infotainment system of the vehicle.

According to some embodiments, the information about the automatically performed operation is displayed on an instrument cluster and/or a head-up display and the operating element for aborting the automatically performed operation is displayed on another display of the vehicle, such as another display arranged to the side of the steering wheel.

In some embodiments, the display arranged to the side of the steering wheel may be designed as a touchscreen display and the automatically performed operation may be aborted or reversed by touching the touch-sensitive surface of the touchscreen display in the location of the operating element depicted.

In some embodiments, the information about the automatically performed operation on the instrument cluster may be temporarily superimposed on the current context in a subregion of the display.

Further features and aspects of the present invention will become apparent from the claims and the following description in conjunction with the FIGS.

In order to better understand the principles of the present technology, embodiments are explained in greater detail below based on the FIGS. It should be understood that the invention is not limited to these embodiments and that the features described may also be combined or modified without departing from the scope of the invention.

FIG. 1 schematically shows a flow diagram for an embodiment of the method for interacting with a suggestion system for operations. By way of example, reference is made to a use for an infotainment system of a vehicle. The suggestion system in this case provides recommendations for operations of an infotainment system integrated in the vehicle, but may also be used for a driver assistance system of the vehicle, for example.

In a first step 1, a recommendation for operating a function is generated. The recommendation may in this case in particular be determined based on previous user behavior in correlation with external parameters such as the current time and the current location of the user. Examples of such recommendations in the field of car infotainment may for example be to switch on the radio on the hour and to tune the radio to a particular station in order to receive news or to start playing music from a music collection as soon as the vehicle drives onto a highway. Regardless of whether or not a recommended operation is automatically performed at a later time, said operation may be displayed to the user so that the user can decide whether they want to follow the suggestion and manually initiate the recommended operation.

In the subsequent step 2, a probability value for the situational relevance of the recommended operation is then determined and compared with a threshold value. The probability value indicates whether the suggestion is suitable for the user at this point in time and/or whether an operation by the user is probable based on the learned previous user behavior. With regard to the examples mentioned above, this means that it is determined whether the user has regularly switched on the radio on the hour in the past to receive news and tuned the radio to a particular station or started playing music when driving onto a highway. Similarly, if the relevant operation has already been automatically performed in the past, it can be taken into consideration whether the user has allowed it to automatically play out or whether said user has aborted and/or reversed it.

If the determined probability value of the recommendation is greater than a predefined threshold value, the operation is not merely suggested to the user as a recommendation but is automatically performed in the subsequent step 3, such that news is broadcast or music is played automatically, for example, as described above. Otherwise, the method goes back to the beginning and generates new recommendations as appropriate.

Information about the automatically performed operation and an operating element for aborting or reversing the automatically performed operation is then displayed to the user in step 4.

In the following step 5, it is checked whether the displayed operating element was actuated by the user. If this is the case, in the subsequent step 6, the automatically performed operation is aborted or reversed. Subsequently, in this case too, the method proceeds with the generation of new recommendations.

FIGS. 2*a* and 2*b* schematically show a multi-display graphical user interface for a possible embodiment of a suggestion system in a vehicle, having the option of user interaction.

In FIGS. 2*a* and 2*b*, a freely programmable instrument cluster 7 is shown, which is typically arranged behind the steering wheel. Two displays 8, 9, modeled on conventional circular gauges, for the revs and speed of the vehicle are shown on the instrument cluster. In addition to additional parameters such as time, temperatures and mileage, a portion of a navigation map 10 is displayed between the rev and speed display 8, 9. Information 11 about an automatically performed operation is given below the map extract, in this case indicating that the "fan has been set to level 3". A pictograph 12 in the form of a cloud of balls, which indicates that the suggestion system is active and has given and/or automatically implemented a recommendation, is shown next to this text message. In addition, the pictograph 12 can visualize system states. Both the text message 11 and the pictograph 12 can be superimposed on a portion of the display on the instrument cluster, for example the portion of the navigation map.

In order to abort or reverse the automatically performed operation, a corresponding operating element 14 appears on another display 13, which may for example be arranged in the region of the center console between the driver and front passenger. The operating element 14 may in this case be in the form of an icon or tile, for example, the thematic connection to the automatically performed operation being explained by a textual indication, for example "fan". In addition, by means of a suitable pictograph, for example, it can be illustrated that actuating the operating element would abort and/or reverse the automatically performed operation. In addition to this tile, additional tiles comprising recommendations in the form of a recommendation bar may also be displayed. These recommendations may relate for example to a destination for the navigation system, a track for the music playlist or a telephone contact. Furthermore, the pictograph 11 indicating the active suggestion system is also displayed on said second display 13 in order to clarify the multiple displays and/or multi-display operation to the user.

If the second display 13 arranged in the region of the center console is designed as a touchscreen display, the automatically performed operation may be reversed or aborted by tapping on the tile shown. By means of visual feedback, it may then be confirmed to the user that the operation has actually been reversed or aborted. For this purpose, a corresponding text message may be displayed on the instrument cluster. Additionally or alternatively, a corresponding indication may be provided on the tile. In addition, the depiction or color of the pictograph indicating the active suggestion system may be changed.

The information about the automatically performed operation may be displayed on another display instead of on the instrument cluster, for example on a head-up display comprising a display projected onto the windshield above the steering wheel. Similarly, the operating element for aborting or reversing the automatically performed operation may be displayed on a display on the side of the steering wheel facing the driver's door instead of on a display in the region of the center console.

The suggestion system integrated in the vehicle can help the user as needed based on a variety of information. Interests of the user or earlier actions of the user may be used as well as the current behavior of the user, which may be detected by user observation by means of suitable sensors in the vehicle. In addition, when the vehicle is being used by a plurality of users, they may be differentiated in order to learn the user behavior of the various users separately and to take this into consideration in the future in order to be able to give customized recommendations to the respective users. Furthermore, the current driving situation, for example based on vehicle parameters such as current speed, or the current surroundings of the vehicle may be taken into consideration by means of sensors attached to the outside of the vehicle.

In particular, the suggestion system may detect recurring routine interactions based on user behavior in combination with time and/or location and carry out said routine interactions in an automated manner on this basis. At the same time, certain functions, such as driving functions or telephone calls for example, may be excluded from this automation.

In addition, a user once again reversing an automatically performed operation may be taken into consideration, in particular if this occurs repeatedly in the same situation. In this case, instead of the operation being automatically performed, a simple recommendation for said operation may be given, or this may be omitted altogether.

FIG. 3 shows a schematic representation of an arrangement according to one embodiment. A control unit 15 generates a recommendation for operating a function, determines a probability value for the performance of the recommended operation, and automatically performs the recommended operation if a high probability value is determined therefor. The control unit 15 may for example control an infotainment apparatus or other components of a vehicle, for example the fan. For this purpose, various parameters 16, such as the current time or current location of the vehicle, the inside temperature of the vehicle, the current driving situation or the current detected user behavior, can be provided to the control unit 15. Similarly, the control unit/apparatus can use information on the learned user behavior that may for example be stored in a database in a vehicle-internal memory.

If a recommended operation is automatically performed, the control unit prompts an image generation and output unit 17 to display information relating hereto on an instrument cluster 7 located behind the indicated steering wheel 18 and/or on a head-up display 19 located above said steering wheel. In addition, the control unit 15 causes the image generation and output unit 17 to display an operating element 14 for aborting or reversing the automatically performed operation on a display 13 arranged in the region of the center console and designed as a touchscreen display. A tap on the touch-sensitive surface in the region of the displayed operating element 14 is recognized by the detection unit 20, which provides information relating hereto to the control unit 15. The control unit 15 then aborts the automatically performed operation or reverses same and prompts the image generation and output unit 17 to adapt or remove the depiction of the indications of the automatically performed operation and corresponding operating element.

The discussed technology may be used in the field of vehicle technology, but it is in no way restricted thereto. In fact, the discussed embodiments may be used in any computer-based system in which interaction with a suggestion system for operations occurs in combination with a graphical user interface.

REFERENCE NUMBER LIST

1 Method step comprising generation of a recommendation for operation
2 Method step comprising determination of a probability value and comparison with a threshold value
3 Method step comprising automatic performance of a recommended operation
4 Method step comprising display of the operation and of an operating element for aborting or reversing the operation
5 Method step comprising checking for an actuation of the operating element
6 Method step comprising aborting the automatically performed operation
7 Instrument cluster
8 Rev counter
9 Tachometer
10 Map extract
11 Textual indication of automatically performed operation
12 Pictograph for active suggestion system
13 Second display
14 Tile symbol for aborting the automatically performed operation
15 Control unit
16 Parameters
17 Image generation and output unit
18 Steering wheel
19 Head-up display
20 Detection unit The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. A method for interacting with a suggestion system having automated operations, wherein the method comprises the following steps:
   generating a first recommendation for an operation based at least on stored user behavior data associated with a first current driving context;
   for the first recommendation for the operation:
      dynamically determining a first probability value for a user performance of the operation based at least on stored user behavior data regarding previous user behavior related to performance of the operation;
      automatically performing the operation in response to the determined first probability value exceeding a defined threshold value as a first instance of the operation;
      displaying information about the automatically performed operation and displaying an operating element for aborting or reversing the automatically performed operation;
      detecting an actuation of the displayed operating element by a user for aborting or reversing the automatically performed operation;
      aborting or reversing the first instance of the automatically performed operation upon the user's actuation of the displayed operating element; and
      updating the stored user behavior data to include the aborting or reversing of the automatically performed operation upon the user's actuation of the displayed operating element;
   generating a second recommendation for the operation based at least on stored user behavior data associated with a second current driving context;
   for the second recommendation for the operation:
      dynamically determining a second probability value for a user performance of the operation based at least on the updated stored user behavior including the aborting or reversing of the first instance of the automatically performed operation upon the user's actuation of the displayed operating element;
      automatically performing the operation if the determined second probability value exceeds the defined threshold value; and
      automatically displaying an indication of the operation, without automatically performing the operation, if the determined second probability value does not exceed the defined threshold value.

2. The method according to claim 1, wherein the information about the automatically performed operation is displayed on a first display and the operating element for aborting or reversing the automatically performed operation is displayed on a second display.

3. The method according to claim 2, wherein the first display comprises one or more of an instrument cluster and a head-up display and the second display comprises another display of the vehicle.

4. The method according to claim 1, wherein the first probability value for the user performance of the operation is determined from previous user behavior and/or based on (a) the stored data regarding previous user behavior related to performance of the operation and (b) external parameters.

5. The method according to claim 4, wherein the external parameters comprise one or more of a current time and a current position of the user.

6. A motor vehicle, configured to carry out the method of claim 1.

7. The method according to claim 1, wherein the stored user behavior data regarding previous user behavior related to performance of the operation comprises data regarding manual performance of the operation by at least one user.

8. The method according to claim 1, wherein the stored user behavior data regarding previous user behavior related to performance of the operation comprises (a) data regarding manual performance of the operation by at least one user and (b) data regarding aborting or reversing the automatically performed operation by user actuation of the displayed operating element.

9. A system comprising a control unit, at least one display and a detection unit, wherein:
   the control unit generates a first recommendation for an operation based at least on stored user behavior data associated with a first current driving context;
   for the first recommendation for the operation, the control unit:
      (a) dynamically determines a first probability value for a user performance of the operation based at least on stored user behavior data regarding previous user behavior related to performance of the operation, and
      (b) automatically performs the operation in response to the determined first probability value exceeding a defined threshold value as a first instance of the operation;
   information about the automatically performed operation and an operating element for aborting or reversing the automatically performed operation is displayed on the at least one display;
   the detection unit detects an actuation of the displayed operating element by the user for aborting or reversing the automatically performed operation;
   the control unit (a) aborts or reverses the automatically performed operation upon the user's actuation of the operating element, and (b) updates the stored user behavior data to include the aborting or reversing of the automatically performed operation upon the user's actuation of the displayed operating element;
   the control unit generates a second recommendation for the operation based at least on stored user behavior data associated with a second current driving context;
   for the second recommendation for the operation, the control unit:
      (a) dynamically determines a second probability value for a user performance of the operation based at least on the updated stored user behavior including the aborting or reversing of the first instance of the automatically performed operation upon the user's actuation of the displayed operating element,
      (b) automatically performs the operation if the determined second probability value exceeds the defined threshold value; and
      (c) automatically displays an indication of the operation, without automatically performing the operation, if the determined second probability value does not exceed the defined threshold value.

10. The system according to claim 9, wherein said system is provided in a vehicle and the operation comprises an operation for an infotainment system of the vehicle.

11. The system according to claim 10, wherein the information about the automatically performed operation is displayed on the at least one display that compromises one or more of an instrument cluster and a head-up display and the operating element for aborting the automatically performed operation is displayed on another display of the vehicle, arranged to the side of the steering wheel.

12. The system according to claim 11, wherein the display arranged to the side of the steering wheel is designed as a touchscreen display and the automatically performed operation may be aborted or reversed by touching the touch-sensitive surface of the touchscreen display in the location of the operating element depicted.

13. The system according to claim 12, wherein the information about the automatically performed operation on the instrument cluster is temporarily superimposed on a current context in a subregion of the instrument cluster.

14. The system according to claim 11, wherein the information about the automatically performed operation on the instrument cluster is temporarily superimposed on a current context in a subregion of the instrument cluster.

15. A motor vehicle, comprising:
a control unit configured to:
generate a first recommendation for an operation based at least on stored user behavior data associated with a first current driving context;
for the first recommendation for the operation:
dynamically determine a first probability value for a user performance of the operation based at least on stored user behavior data regarding previous user behavior related to performance of the operation; and
automatically performs the operation in response to the determined first probability value exceeding a defined threshold value as a first instance of the operation;
at least one display configured to display information about the automatically performed operation and an operating element for aborting or reversing the automatically performed operation;
a detection unit configured to detect an actuation of the displayed operating element by the user for aborting or reversing the automatically performed operation; and
wherein the control unit is further configured to:
abort or reverse the first instance of the automatically performed operation upon the user's actuation of the operating element;
update the stored user behavior data to include the aborting or reversing of the automatically performed operation upon the user's actuation of the displayed operating element;
generate a second recommendation for the operation based at least on stored user behavior data associated with a second current driving context; and
for the second recommendation for the operation:
dynamically determine a second probability value for a user performance of the operation based at least on the updated stored user behavior including the aborting or reversing of the first instance of the automatically performed operation upon the user's actuation of the displayed operating element;
automatically perform the operation if the determined second probability value exceeds the defined threshold value; and
automatically display an indication of the operation, without automatically performing the operation, if the determined second probability value does not exceed the defined threshold value.

* * * * *